United States Patent [19]
Kawasaki

[11] Patent Number: 6,003,137
[45] Date of Patent: Dec. 14, 1999

[54] VIRTUAL GROUP INFORMATION MANAGING METHOD IN BRIDGE FOR NETWORK CONNECTION

[75] Inventor: Masayo Kawasaki, Tokyo, Japan

[73] Assignee: NEC Corporation, Tokyo, Japan

[21] Appl. No.: 08/927,732

[22] Filed: Sep. 11, 1997

[30] Foreign Application Priority Data

Sep. 11, 1996 [JP] Japan ................................ 8-240796

[51] Int. Cl.⁶ .............................. G06F 13/00; H04L 9/00
[52] U.S. Cl. .......................................... 713/201; 709/223
[58] Field of Search ..................... 395/187.01, 200.53, 395/200.54, 200.55, 184.01, 183.19, 200.79; 707/9; 713/200; 709/1

[56] References Cited

U.S. PATENT DOCUMENTS

| | | | |
|---|---|---|---|
| 4,945,468 | 7/1990 | Carson et al. | 364/200 |
| 5,208,811 | 5/1993 | Kashio et al. | 370/94 |
| 5,633,869 | 5/1997 | Burnett et al. | 370/396 |
| 5,673,031 | 9/1997 | Meier | 340/825.08 |
| 5,677,910 | 10/1997 | Delaney | 370/402 |
| 5,734,824 | 3/1998 | Choi | 395/200.11 |
| 5,761,435 | 6/1998 | Fukuda et al. | 395/200.68 |
| 5,802,290 | 9/1998 | Casselman | 395/200.31 |
| 5,802,319 | 9/1998 | Faulk, Jr. et al. | 395/200.79 |
| 5,844,903 | 12/1998 | Terashita et al. | 370/403 |

OTHER PUBLICATIONS

"International Standard ISO/IEC 10038 ANSI/IEEE Std. 802.ID.", Jul. 8, 1997.

*Primary Examiner*—Robert W. Beausoliel, Jr.
*Assistant Examiner*—Scott Baderman
*Attorney, Agent, or Firm*—Sughrue, Mion, Zinn, Macpeak & Seas, PLLC

[57] ABSTRACT

In a bridge for networks, connection regulation between terminals which can permit maintenance of security is carried out by using a virtual group constituting information database set with information about how to prepare virtual groups by designating ports and MAC addresses, a virtual group constituting information expansion database set with information pieces about virtual group ID's included in individual ports in units of ports, and a MAC address learning table database set with MAC address learning tables in units of MAC addresses.

14 Claims, 11 Drawing Sheets

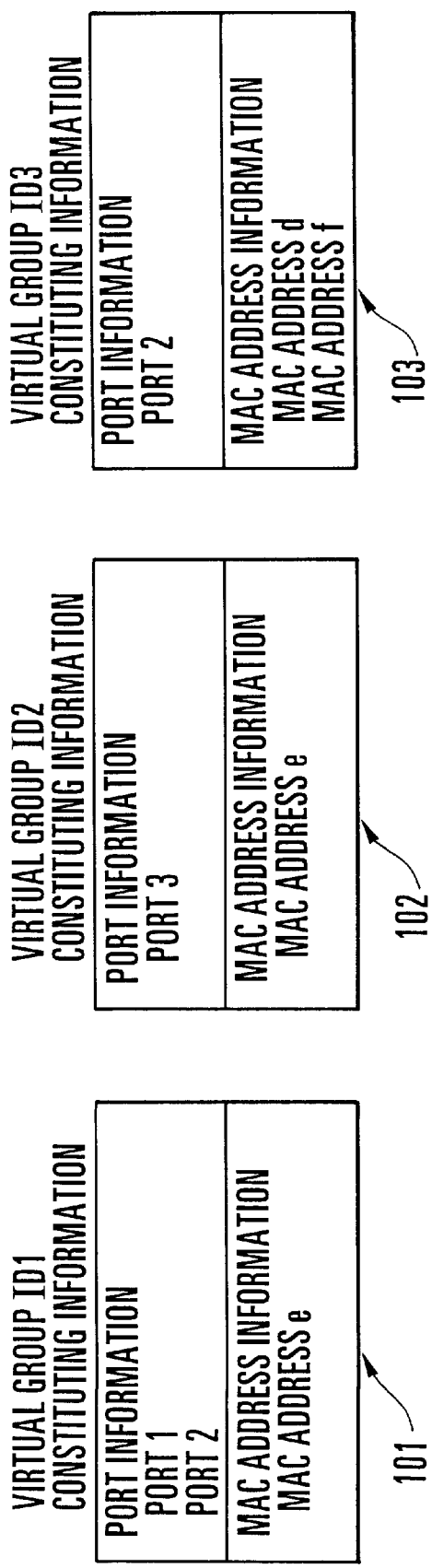

○ : PERMISSION
× : REGULATION

| | | Communication Destination MAC Address | | | | | |
|---|---|---|---|---|---|---|---|
| | | a | b | c | d | e | f |
| Transmission Originator MAC Address | a | — | ○ | ○ | × | ○ | × |
| | b | ○ | — | ○ | × | ○ | × |
| | c | ○ | ○ | — | ○ | ○ | ○ |
| | d | × | × | ○ | — | ○ | ○ |
| | e | ○ | ○ | ○ | ○ | — | × |
| | f | × | × | ○ | ○ | × | — |

FIG. 9

| VIRTUAL GROUP ID | ACCOMMODATION INFORMATION | REMARKS |
|---|---|---|
| VIRTUAL GROUP ID1 | PORT 1, SERVER 1 | FOR DEPARTMENT A |
| VIRTUAL GROUP ID2 | SERVER 1, SERVER 2, TERMINAL B-1 | FOR DEPARTMENT B (SEVER MANAGER) |
| VIRTUAL GROUP ID3 | PORT 3, TERMINAL C-1, TERMINAL C-2, TERMINAL C-3 | FOR DEPARTMENT C |

FIG. 12 PRIOR ART

| ID | MAC ADDRESS | RECEIVING PORT NUMBER | TRANSMISSION DESTINATION BIT PATTERN |
|---|---|---|---|
| 1 | MAC-1 | PORT 1 | 0000 0010 1111 0000 0000 0000 0000 0000 |
| 2 | MAC-2 | PORT 2 | 0000 1111 1111 0000 0000 0000 0000 0000 |
| 3 | MAC-3 | PORT 3 | 0000 0010 1100 0011 0000 0000 0000 0000 |

6,003,137

VIRTUAL GROUP INFORMATION MANAGING METHOD IN BRIDGE FOR NETWORK CONNECTION

BACKGROUND OF THE INVENTION

The present invention relates to the terminal/port selecting function in a bridge having a plurality of connecting ports and adapted to mutually connect networks in, for example, internal LAN and more particularly to a method of managing virtual group information for performing regulation of connection between terminals in virtually prepared groups of terminals.

In recent years, the terminal/port selecting function in a multi-port bridge having a plurality of connecting ports has been used for performing management of connection between terminals and a description of this function is given in international standard ISO/IEC 10038 ANSI/IEEE Std. 802.1D. To describe the function with reference to FIG. 12, in this function, an input port 202 of received data and a bit map 203 of a port to which the data is transmitted are set in correspondence to a MAC (Media Access Control) address 201 for terminal/port selection by using the manager function, and connection regulation (forwarding or blocking) of the data is determined in accordance with the contents of the above setting.

Disadvantageously, for example, when terminals having addresses specific thereto, that is, MAC addresses are divided into two groups A and B, it is very difficult for the aforementioned conventional method to realize regulation of communications between the two groups by only the terminal/port selecting function and besides setting by the manager function is complicated, because the conventional terminal/port selecting function is effective for a mere aggregation of regulations of paired connection and a transmission destination is limited by the selecting function effected by a port.

SUMMARY OF THE INVENTION

The present invention contemplates elimination of the above problems and has its object to assist in the conventional terminal/port selecting function, insufficient to maintain security upon mutual connection of networks, by providing the function of easily permitting the maintenance of security of networks even in a data link layer and to facilitate setting of the manager function.

To accomplish the above object, in a virtual group information managing method according to the present invention, a plurality of virtual groups each constituted by terminals or ports connected to a bridge for mutually connecting a plurality of networks are defined, a first database is defined by recording ports or addresses of terminals belonging to individual groups in memory areas provided for the individual virtual groups, and permission and regulation of communications between the terminals are controlled on the basis of the first database.

In an embodiment of the present invention, a second database is provided which is prepared on the basis of the first database and defined by recording a virtual group or groups to which the individual ports belong in memory areas provided for the individual ports, and permission and regulation of communications between the terminals are controlled on the basis of the second database.

In another embodiment of the present invention, a third database is provided which is prepared on the basis of the first database and defined by recording a virtual group or groups to which the individual terminals belong in memory areas provided for the individual terminal addresses, and permission and regulation of communications between the terminals are controlled on the basis of the third database.

In still anther embodiment of the present invention, the third database is updated on the basis of the second database or the second and third databases each time that communications between the terminals is carried out.

BRIEF DESCRIPTION OF THE DRAWINGS

FIG. 2 is a diagram for explaining an example of a virtual group constituting information database in FIG. 1.

FIG. 3 is a diagram for explaining an example of a virtual group constituting information expansion database in FIG. 1.

FIG. 5 is a diagram for explaining an example of the MAC address learning table database after learning through a MAC address information learning process.

FIG. 6 is a diagram for explaining results of communication permission/regulation in individual transmission originators/transmission destinations.

FIG. 9 is a diagram for explaining a virtual group constituting information database.

FIG. 12 is a diagram for explaining the conventional terminal/port selecting function.

DESCRIPTION OF THE PREFERRED EMBODIMENTS

The invention will now be described by way of example with reference to the accompanying drawings.

Figure 1:
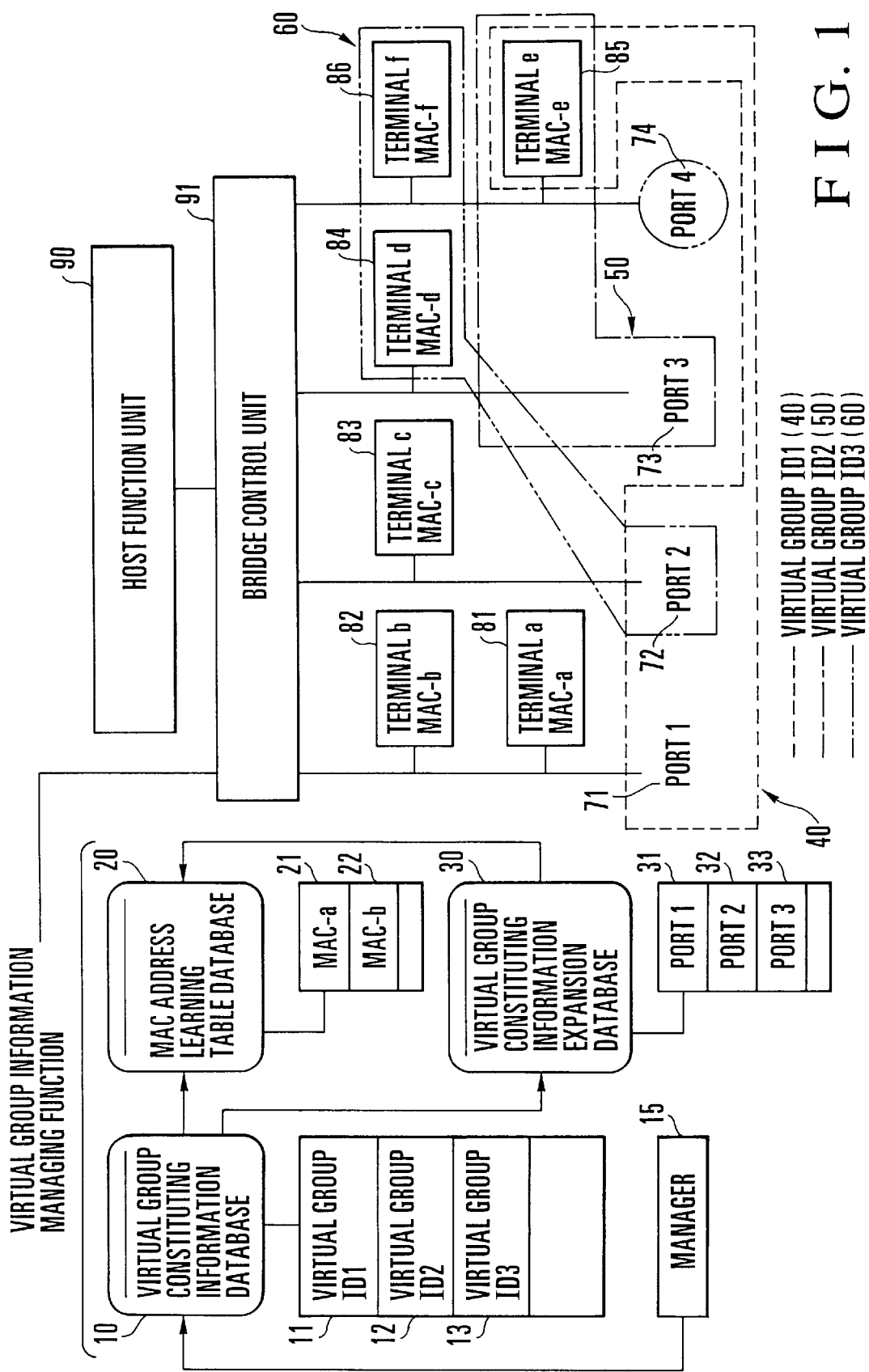
FIG. 1 is a block diagram useful to explain the virtual group information managing function in a bridge according to an embodiment of the present invention.

FIG. 1 is a block diagram illustrative of the virtual group information managing function in a bridge for a network. A virtual group constituting information database 10 includes virtual group ID (identifier) information pieces, and registration information pieces of ports and MAC addresses are stored in the virtual group ID information pieces, respectively. A MAC address learning table database 20 includes MAC address learning tables in units of MAC addresses specific to terminals. The MAC address learning table includes virtual group ID accommodation list information and original virtual group ID accommodation list information. A virtual group constituting information expansion database 30 is set, in units of ports, with information pieces about individual virtual group ID's including a port or ports. When defining the virtual group constituting information database 10, a user uses a manager 15 for writing operation. A host function unit 90 and a bridge control unit 91 prepare the virtual group constituting information expansion database 30 and MAC address learning table database 20 by using the virtual group constituting information database 10, and permission and regulation of terminal/port connection are carried out in accordance with these databases 10, 20 and 30.

Next, the operation of the present embodiment of the invention will be described with reference to FIGS. 1 to 6. The virtual group constituting information database 10 can register a plurality of virtual group ID constituting information pieces ID1, ID2 and ID3 (11, 12 and 13) and a registration/deletion process for storing a plurality of ports or a plurality of MAC addresses in the individual virtual group ID constituting information pieces is carried out under the direction of the manager 15.

This will be described specifically by taking an example as shown in FIG. 2. The virtual group ID1 constituting information piece as indicated by 101 accommodates a port 1, a port 2 and a MAC address e, the virtual group ID2 constituting information piece as indicated by 102 accommodates a port 3 and the MAC address e and the virtual group ID3 constituting information piece as indicated by 103 accommodates the port 2 and MAC addresses d and f. In FIG. 1, the ports 1 to 3 are designated by reference numerals 71, 72 and 73, respectively, and the MAC addresses d, e and f are designated by reference numerals 84, 85 and 86, respectively. The user uses the manager 15 to perform the registrations as above. It will be noted from FIG. 2 that an identical port can be accommodated in a plurality of virtual group ID constituting information pieces as exemplified by the port 2 (72) which is accommodated in the virtual group ID's 1 (101) and 3 (103). This holds true for the MAC address. The MAC addresses e (85) and f (86) connected to a port 4 (74) may be registered separately in the virtual group ID's 1 (101), 2 (102) and 3 (103).

The virtual group constituting information expansion database 30 is initially generated when the virtual group constituting information database 10 is updated. The virtual group constituting information expansion database 30 is prepared by expanding all virtual group accommodating information pieces into virtual group ID accommodation list information pieces in units of ports on the basis of the virtual group constituting information database 10. Individual virtual group ID's are set, in the form of a bit pattern format, in virtual group ID accommodation list information pieces of individual ports accommodated in the corresponding virtual group ID or ID's.

This will be described specifically by taking an example shown in FIG. 3. Since, in FIG. 2, the port 2 (72) is accommodated in the virtual group ID's 1 (101) and 3 (103) and the port 3 (73) is accommodated in the virtual group ID2 (102), the first and third bits in the virtual group ID accommodation list information for port 2 (111) are ON and the second bit in the virtual group ID accommodation list information for port 3 (112) is ON. But since the port 4 (74) is not accommodated in any virtual group, all bits in the virtual group ID accommodation list information for port 4 are OFF.

The MAC address learning table database 20 is initially generated when the virtual group constituting information database 10 is updated, and prepared and updated through a MAC address information learning process upon reception of data by a terminal. A method of preparing the MAC address learning table database 20 which is initially generated when the virtual group constituting information database 10 is updated will first be described. More particularly, the MAC address learning table database 20 is prepared by expanding all virtual group accommodation information pieces into MAC address learning tables in units of MAC addresses on the basis of the virtual group constituting information database 10. Individual virtual group ID's are set, in the form of a bit pattern format, in original virtual group ID accommodation list information pieces in the MAC address learning tables of individual MAC addresses accommodated in the corresponding virtual group ID or ID's.

Figure 4:
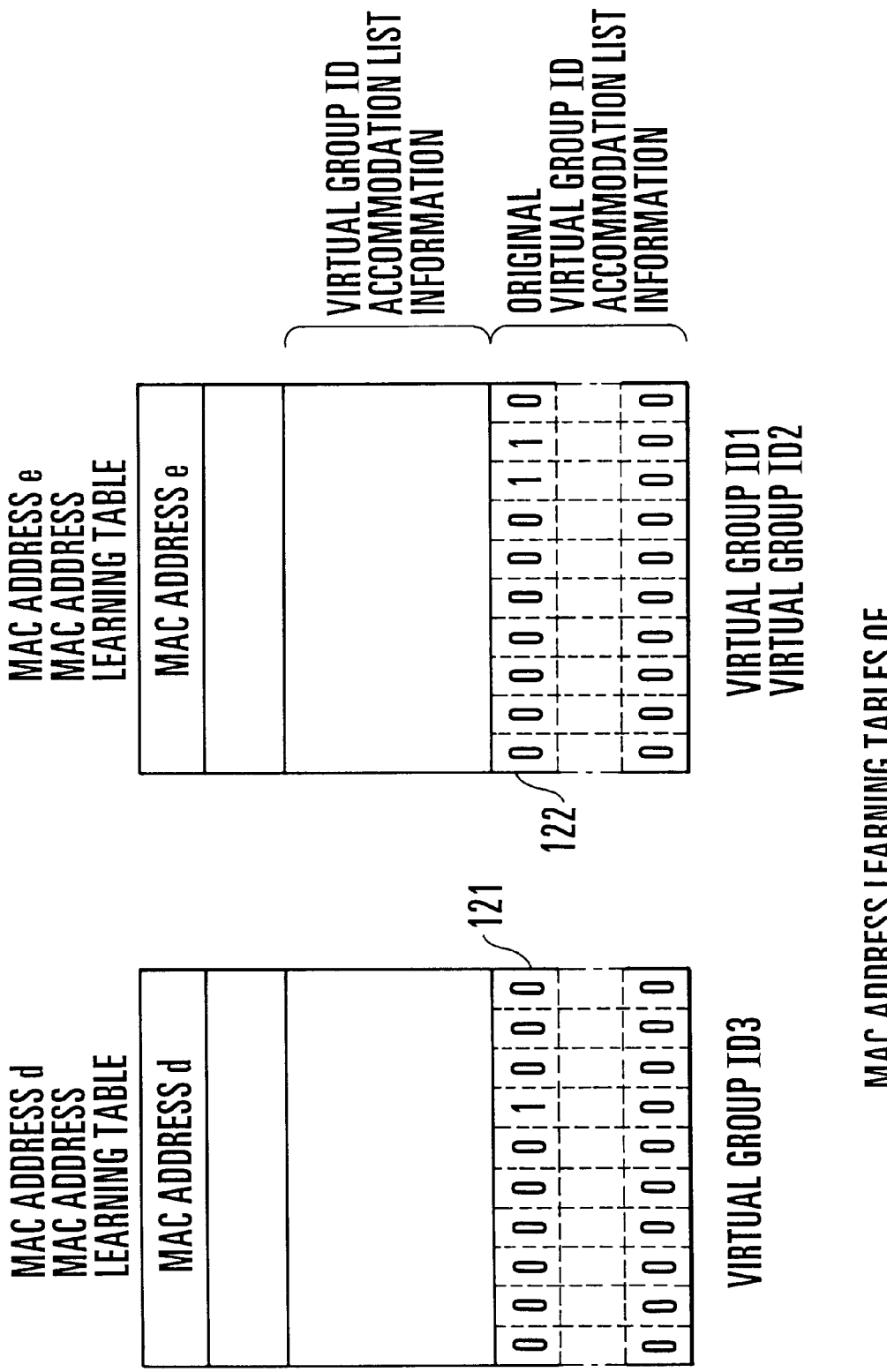
FIG. 4 is a diagram for explaining an example of a MAC address learning table database in FIG. 1.

This will be described specifically by taking an example as shown in FIG. 4. Since, in FIG. 2, the MAC address d (84) is accommodated in the virtual group ID 3 (103), the third bit in an original virtual ID accommodation list information piece (121) in a MAC address learning table for MAC address d is ON and since the MAC address e (85) is accommodated in the virtual group ID's 1 (101) and 2 (102), the first and second bits in an original virtual group ID accommodation list information piece (122) in a MAC address learning table for MAC address e are ON.

A method of preparing the MAC address learning table database 20 upon reception of data by a terminal through a MAC address information learning process will be described. The preparing method for the MAC address learning table database 20 differs for the case where the MAC address learning table to be prepared is a table which is initially generated upon updating of the virtual group constituting information database 10 as described in connection with FIG. 4 (case 1) and for the other case (case 2). In case 1, the already set bit pattern (121, 122) in the original virtual group ID accommodation list information in the MAC address learning table and the virtual group ID accommodation list information (111, 113) of a port receiving data in the virtual group constituting information expansion database 30 are ORed to provide a result which in turn is set in the virtual group ID accommodation list information of the MAC address learning table. In case 2, the virtual group ID accommodation list information (111, 113) of a port receiving data in the virtual group information expansion database 30 is copied on the virtual group ID accommodation list information of the MAC address learning table.

Figure 5:
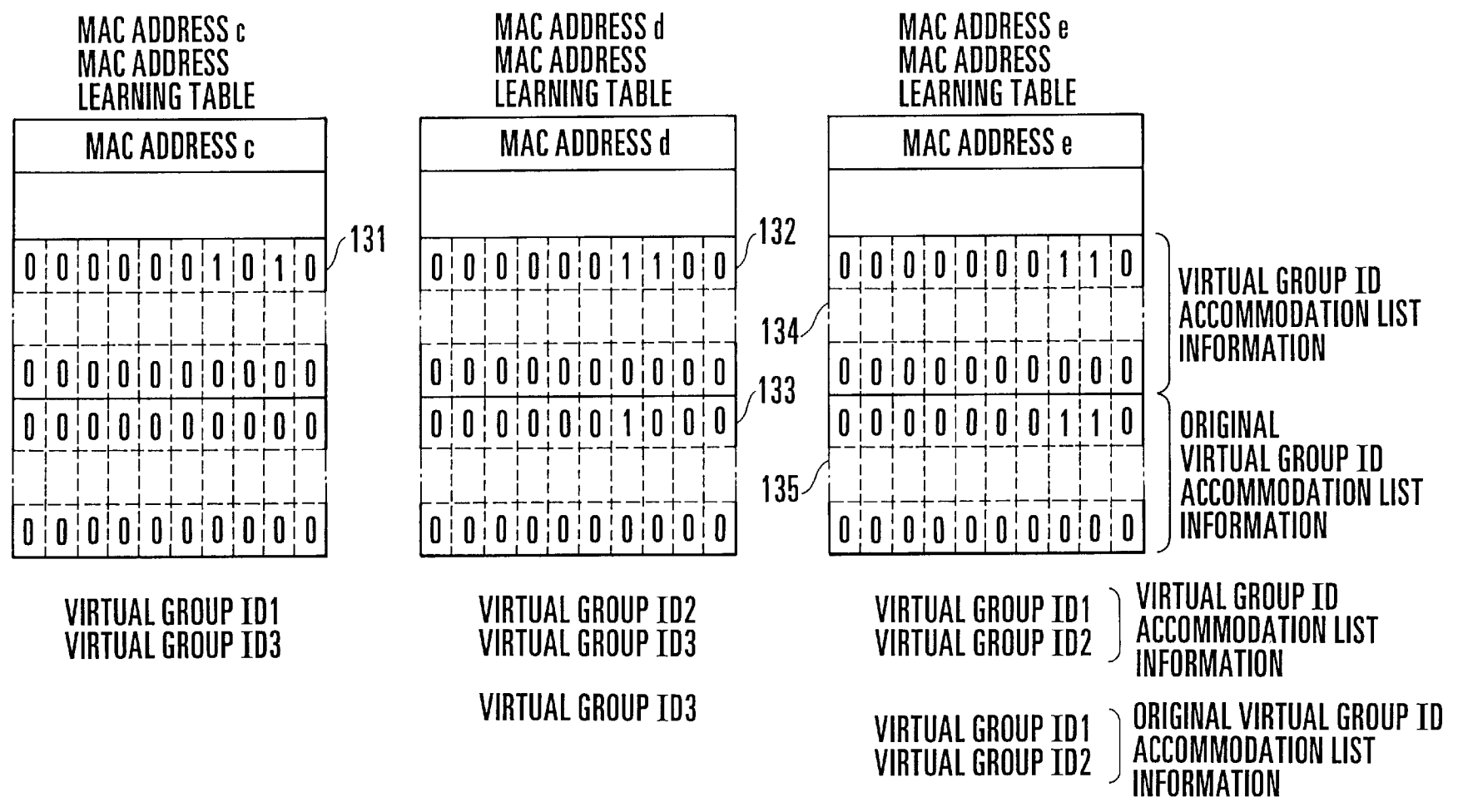

This will be described specifically by taking an example as shown in FIG. 5. In the aforementioned case 1, when data whose transmission originator MAC address is the MAC address d (84) is received from, for example, the port 3 (73), the already set bit pattern (121 or 133) in the original virtual group ID accommodation list information in the MAC address learning table and the virtual group ID accommodation list information (112) for port 3 in the virtual group constituting information expand database are ORed and a result is set in the virtual group ID accommodation list information (132) of the MAC address learning table for MAC address d, so that the second and third bits are rendered to be ON. When data whose transmission originator MAC address is the MAC address e (85) is received from, for example, the port 4 (74), the already set bit pattern (122 or 135) in the original virtual group ID accommodation list information in the MAC address learning table and the virtual group ID accommodation list information (113) for port 4 in the virtual group constituting information expansion database are ORed and a result is set in the virtual group ID accommodation list information (134) of the MAC address learning table for MAC address e, so that the first and second bits are rendered to be ON. In the aforementioned case 2, when data having a transmission originator MAC address of MAC address c (83) is received similarly from, for example, the port 2 (72), the virtual group ID accommodation list information (111) for port 2 in the virtual group constituting information expansion database is set, as virtual group ID or ID's, in the virtual group ID accommodation list information (131) of the MAC address learning table for MAC address c, so that the first and third bits are rendered to be ON.

In this manner, the information about the virtual group ID's in which the individual MAC addresses are accommodated is reflected on the virtual group ID accommodation list information of the MAC address learning table and therefore, by checking the virtual group ID accommodation list information pieces of the MAC address learning tables in the transmission originator and the transmission destination, forwarding (when the same virtual ID is set) or blocking (when the same virtual group ID is not set) can be determined. This is illustrated in FIG. 6.

Referring now to FIGS. 7 to 11, the invention will be described specifically by way of an example of a general network conceptual configuration.

Figure 7:
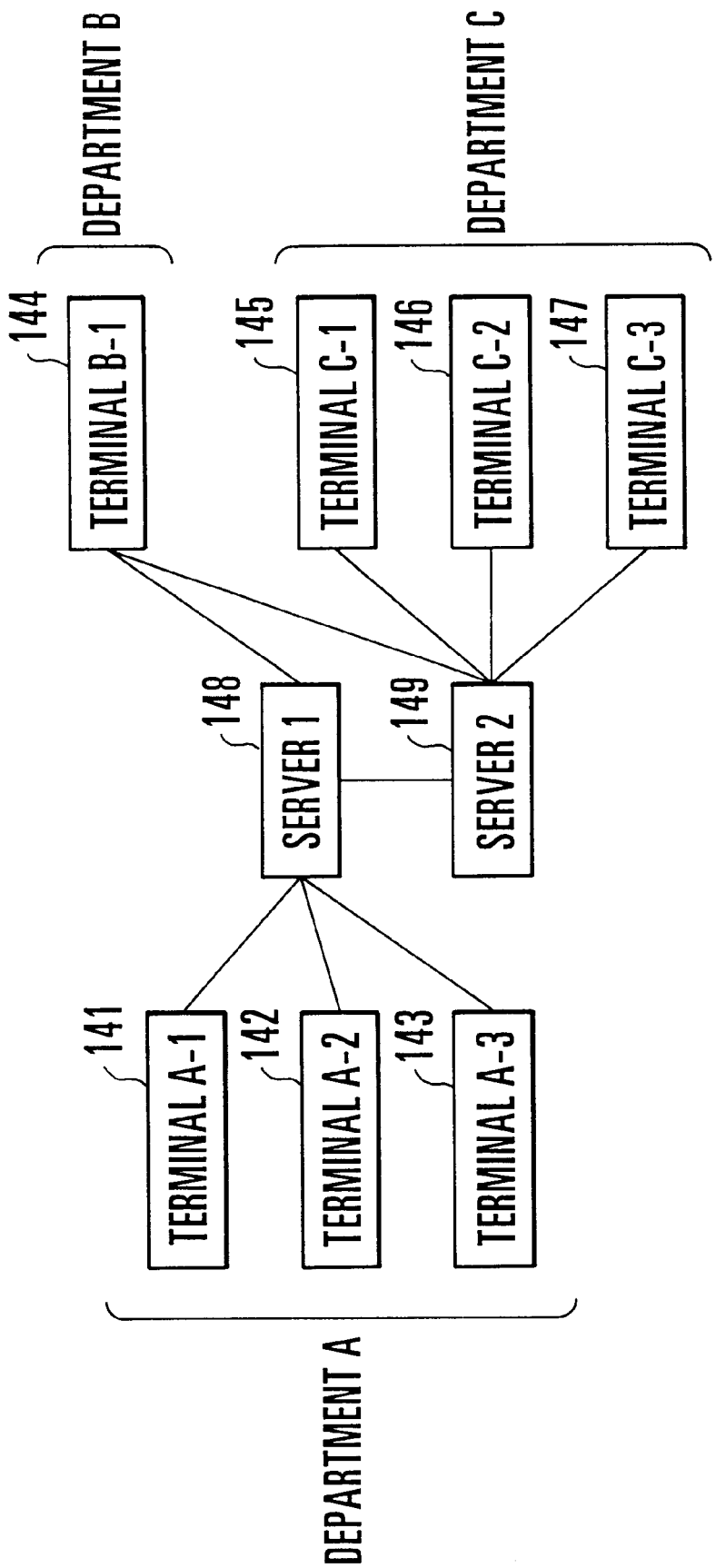
FIG. 7 is a diagram for explaining a network conceptional configuration.
Figure 8:
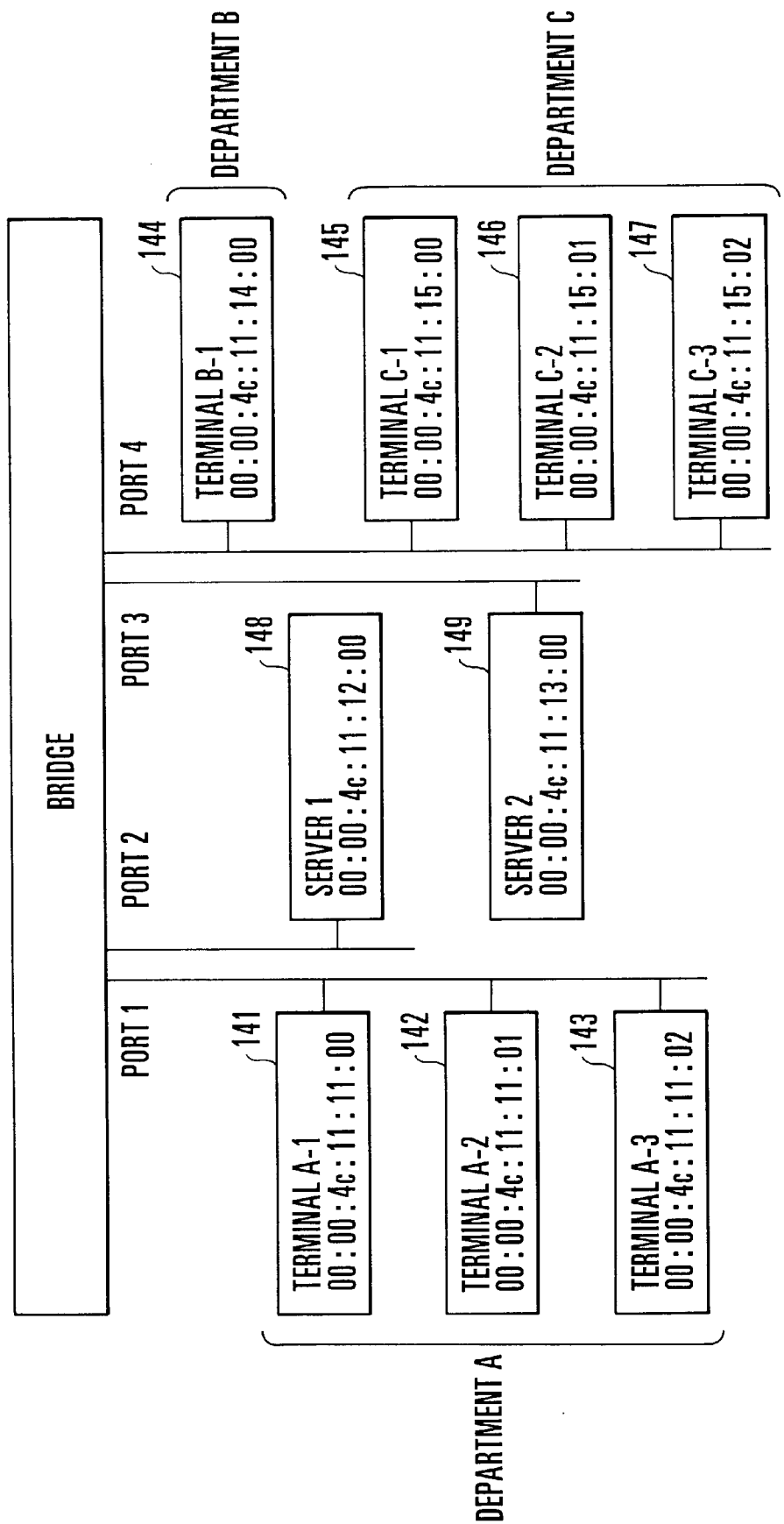
FIG. 8 is a diagram for explaining network connection.

When a group in a department A is constructed of terminals A-1 to A-3 (141 to 143) of its own department and a server 1 (148), a group in a department B is constructed of a terminal B-1 (144) and severs 1 and 2 (148 and 149) because the department B is a server managing department and a group in a department C is constructed of terminals C-1 to C-3 (145 to 147) of its own department and the server 2 (149), a diagram of network conceptual configuration can be defined as shown in FIG. 7. The terminals existing in the FIG. 7 network conceptual configuration can be indicated in the form of actual network connection as shown in FIG. 8. The terminals are divided into virtual groups on the basis of the network connection to provide virtual group constituting information as shown in FIG. 9.

Figure 10:
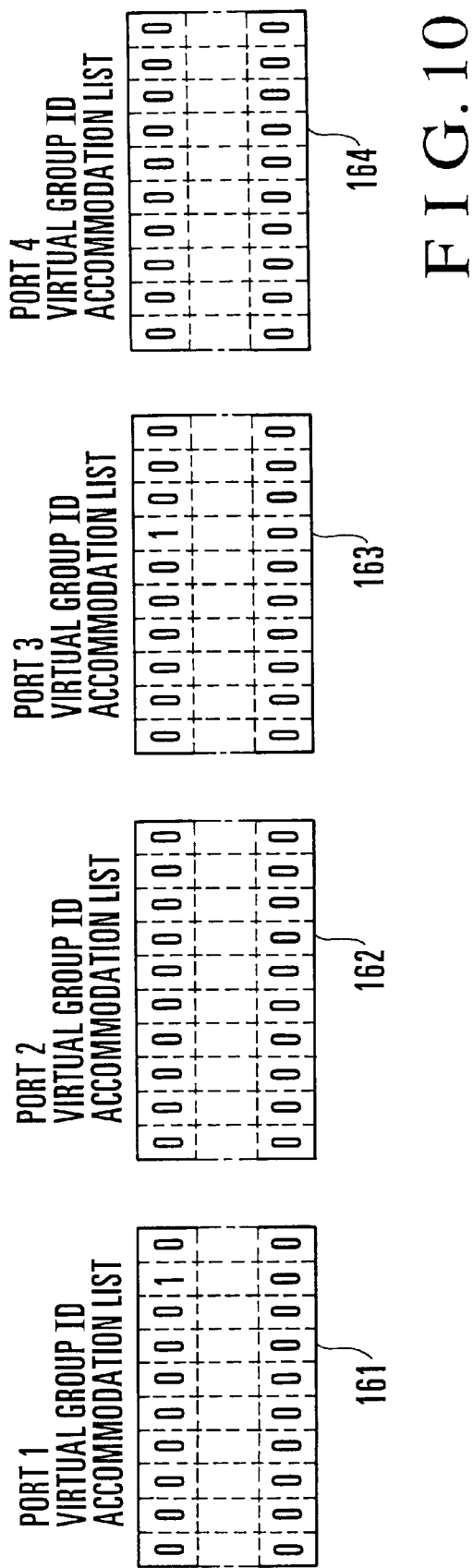
FIG. 10 is a diagram for explaining a database expanded on the basis of the virtual group constituting information.

Next, the contents of the virtual group constituting information expansion database and MAC address learning table database which are generated when the virtual group constituting information of FIG. 9 is updated will be described. Since, in the virtual group constituting information, a port 1 is accommodated in a virtual group ID1 and a port 3 is accommodated in a virtual group ID3, the virtual group constituting information expansion database is expanded as shown in FIG. 10.

Figure 11:
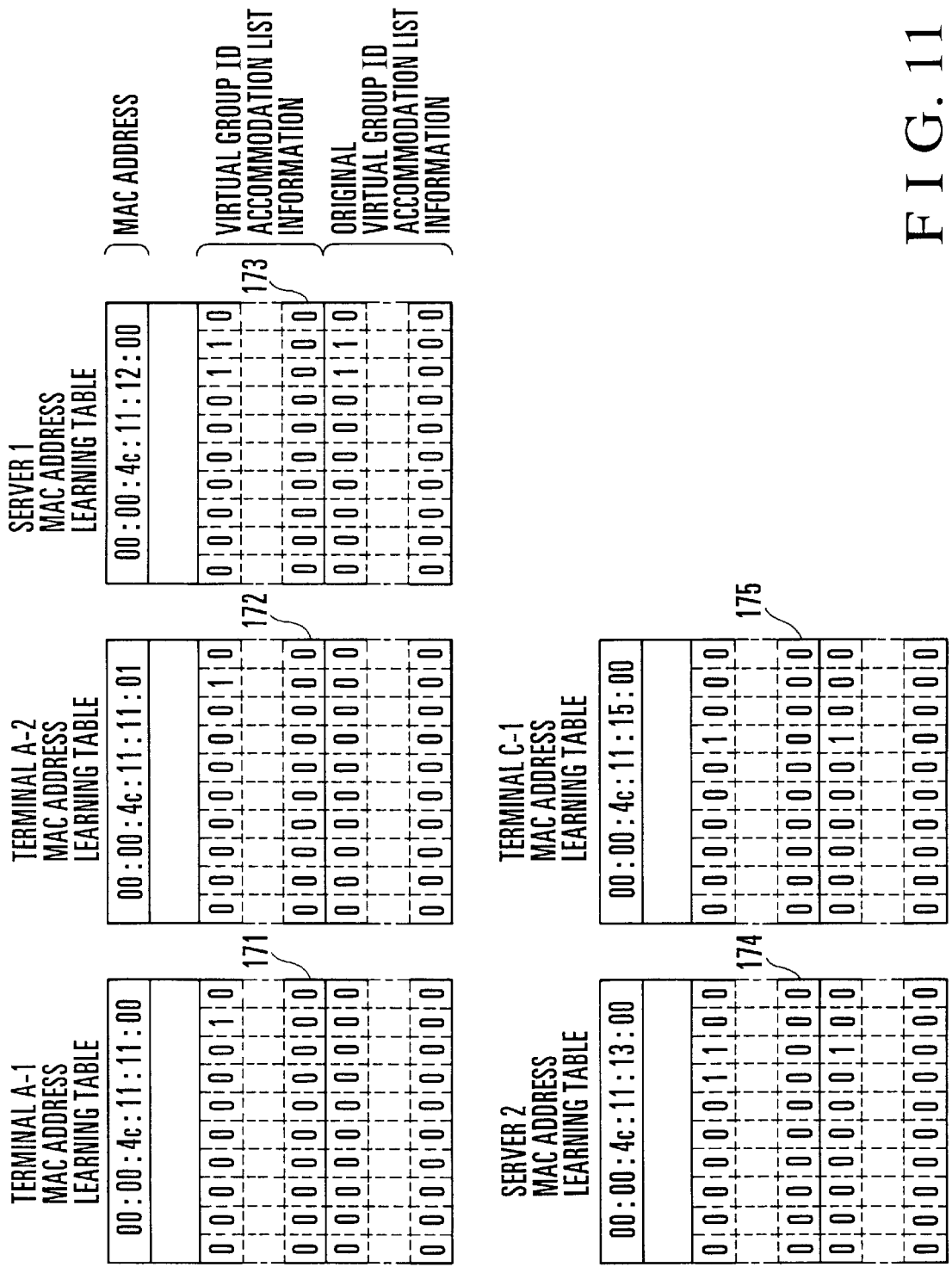
FIG. 11 is a diagram for explaining another database expanded on the basis of the virtual group constituting information.

Since the server 1 is accommodated in virtual group ID's 1 and 2, the server 2 is accommodated in the virtual group ID2 and the terminal C-1 is accommodated in the virtual group ID3, the original virtual group ID accommodation list information of the MAC address learning table database is expanded as shown in FIG. 11.

Next, virtual group ID accommodation list information pieces of the MAC address learning table database prepared on the basis of the above information pieces upon reception of data by a terminal or a server will be described with reference to FIG. 11.

When the terminals A-1 and A-2 receive data from the port 1, virtual group ID accommodation list information pieces (171 and 172) of the MAC address learning table of the terminals A-1 and A-2 are prepared from the contents of the virtual group ID accommodation list of the port 1 and the contents of original virtual group ID accommodation list information pieces of the MAC address learning table of the terminals A-1 and A-2.

Further, when the server 1 receives data from the port 2, a virtual group ID accommodation list information piece (173) of the MAC address learning table of server 1 is prepared from the contents of the virtual group ID accommodation list of port 2 and the contents of the original virtual group ID accommodation list information of the MAC address learning table of server 1.

Further, when the server 2 receives data from the port 3, a virtual group ID accommodation list information piece (174) of the MAC address learning table of server 2 is prepared from the contents of the virtual group ID accommodation list of port 3 and the contents of the original virtual group ID accommodation list information of the MAC address learning table of server 2.

Further, when the terminal C-1 receives data from the port 4, a virtual group ID accommodation list information piece (175) of the MAC address learning table of terminal C-1 is prepared from the contents of the virtual group ID accommodation list of port 4 and the contents of the original virtual group ID accommodation list information of the MAC address learning table of terminal C-1.

Keeping the above in mind, examples of a possible connection regulation will be described. The terminal A-1 (141) can be connected to the terminal A-2 (142) in its own department because it can be proven from FIG. 11 by checking the virtual group ID accommodation list information (171) of the MAC address learning table of terminal A-1 and the virtual group ID accommodation list information (172) of the MAC address learning table of terminal A-2 that both the terminals A-1 and A-2 are accommodated in the virtual group ID1.

Similarly, the terminal A-1 (141) can also be connected to the server 1 (148). But the terminal A-1 (141) cannot be connected to the server 2 (149) because it can be proven from FIG. 11 by checking the virtual group ID accommodation list information (171) of the MAC address learning table of terminal A-1 and the virtual group ID accommodation list information (174) of the MAC address learning table of server 2 that there is no virtual group accommodating the terminal A-1 and the server 2. In other words, the terminal A-1 (141) is accommodated in only the virtual group ID1 and the server 2 (149) is accommodated in only the virtual groups ID's 2 and 3.

Similarly, the terminal A-1 (141) cannot be connected to the terminal C-1 (145) accommodated in only the virtual group ID3, either, because it can be proven from FIG. 11 by checking the virtual group ID accommodation list information (171) of the MAC address learning table of terminal A-1 and the virtual group ID accommodation list information (175) of the MAC address learning table of terminal C-1 that there is no virtual group ID accommodating both the terminals A-1 and C-1. In other words, the terminal A-1 (141) is accommodated in only the virtual group ID1 and the terminal C-1 (145) is accommodated in only the virtual group ID3.

As described above, the virtual group information managing method in bridge according to the present invention can attain advantages as below.

The virtual group information managing function can designate the virtual group constituting information in the bridge in a unit of port or in a unit of MAC address to permit regulation of connection to a different group. Accordingly, a fine connection regulation which meets the connection form between networks and a pattern of connection regulation between terminals can be provided to facilitate maintenance of security.

What is claimed is:

1. A virtual group information managing method, comprising:

defining a plurality of virtual groups, each of said virtual groups including at least one member selected from a set consisting of terminals and ports, said terminals and ports being connected to a bridge a for mutually connecting a plurality of networks, defining a first database by recording ports or addresses of terminals belonging to individual ones of said virtual groups, in memory areas provided for the individual virtual groups, and controlling permission and regulation of communications between said terminals based on said first database.

2. A virtual group information managing method, comprising:

defining a plurality of virtual groups, each of said virtual groups including at least one member selected from a set consisting of terminals and ports, said terminals and ports being connected to a bridge for mutually connecting a plurality of networks, defining a first database by recording ports or addresses of terminals belonging to individual ones of said virtual groups, in memory areas provided for the individual virtual groups, providing a second database, prepared on the basis of said first database, and defined by recording at least one said virtual group, to which respective ones of said ports belong, in respective memory areas provided for said respective ones of said ports, and controlling permission and regulation of communications between said terminals based on said second database.

3. A virtual group information managing method according to claim 2, further comprising:

providing a third database, prepared on the basis of said first database, and defined by recording at least one said virtual group, to which respective ones of said terminals belong, in respective memory areas provided for respective addresses of said respective ones of said terminals, and controlling permission and regulation of communications between said terminals based on said third database.

4. A virtual group information managing method according to claim 3, further comprising updating said third database on the basis of said second database each time communications between said terminals is carried out.

5. A virtual group information managing method according to claim 4, wherein;

said third database is a MAC address learning table database which stores MAC address learning tables each having virtual group ID accommodation list information and original virtual group ID accommodation list information, said MAC address being specific to a terminal, said second database is a virtual group constituting information expansion database, and the virtual group ID accommodation list information of said third database is updated on the basis of the contents of said second database and the contents of the original virtual group ID accommodation list information of said third database.

6. A virtual group information managing method according to any one of claims 3 to 5, wherein:

said second database has accommodation list information pieces of virtual group ID's to which individual ports belong, said third database has accommodation list information pieces of virtual group ID's to which individual MAC addresses belong, and communications between one of said terminals and one of said ports is permitted when the virtual ID accommodation list information of said second database coincides with that of said third database but is not permitted when the virtual ID accommodation list information of said second database does not coincide with that of said third database.

7. A virtual group information managing method, comprising:

defining a plurality of virtual groups, each of said virtual groups including at least one member selected from a set consisting of terminals and ports, said terminals and ports being connected to a bridge for mutually connecting a plurality of networks, defining a first database by recording ports or addresses of terminals belonging to individual ones of said virtual groups, in memory areas provided for the individual virtual groups, providing a third database, prepared on the basis of said first database, and defined by recording at least one said virtual group, to which respective ones of said terminals belong, in respective memory areas provided for respective addresses of said respective ones of said terminals, and controlling permission and regulation of communications between said terminals based on said third database.

8. A virtual group information managing method according to claim 7, further comprising updating said third database each time communications between said terminals is carried out.

9. A virtual group information managing method according to claim 8, wherein:

said third database is a MAC address learning table database storing MAC address learning tables;

each of said MAC address learning tables have virtual group ID accommodation list information and original virtual group ID accommodation list information;

said MAC address is specific to one of said terminals; and the virtual group ID accommodation list information of said third database is updated on the basis of virtual group constituting information the contents of the original virtual group ID accommodation list information of said third database.

10. An access management method for devices connected to ports of a bridge having more than two ports, said method comprising:

defining virtual groups;

defining, for each of said virtual groups, one or more respective members selected from a set consisting of said devices and said ports, a given device being one of said respective members of one or more of said virtual groups;

for said given one of said devices, permitting communications to another of said devices when said another device is one of said respective members of one of the same virtual groups as said given device;

for said given device, permitting communications to said another device when one of said ports is one of said respective members of one of the same virtual groups as said given device, and said another device is connected to said one of said ports; and for said given device, prohibiting communications to said another device when said communications are not permitted.

11. The access management method as set forth in claim 10, wherein:

said defining of said virtual groups comprises providing a first database including a virtual group identifier for each said virtual group and a respective MAC address for each of said devices defined as respective members of said virtual group.

12. The access management method as set forth in claim 11, further comprising providing a second database including, for each said port, a virtual group identifier accommodation list indicating said virtual groups for which said port is a respective member.

13. The access management method as set forth in claim 12, further comprising providing a third database including, for each said device, an original virtual group identifier accommodation list indicating said virtual groups for which said device is a respective member.

14. The access management method as set forth in claim 13, further comprising combining said original virtual group identifier accommodation list of a particular one of said devices with said virtual group identifier accommodation list of the one of said ports to which said particular device is connected to produce a resulting accommodation list indicating all of said virtual groups for which communications with said particular device is permitted.

* * * * *